C. STVANEK.
BEVEL GEAR CHUCK.
APPLICATION FILED DEC. 20, 1910.
1,022,761.
Patented Apr. 9, 1912.
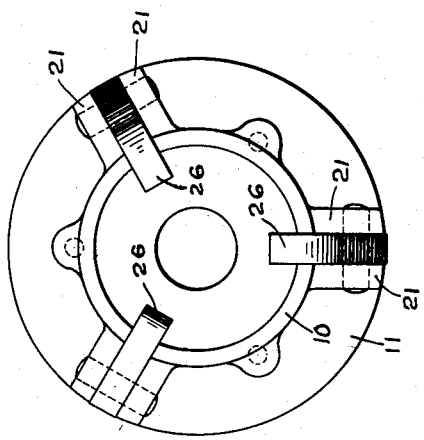
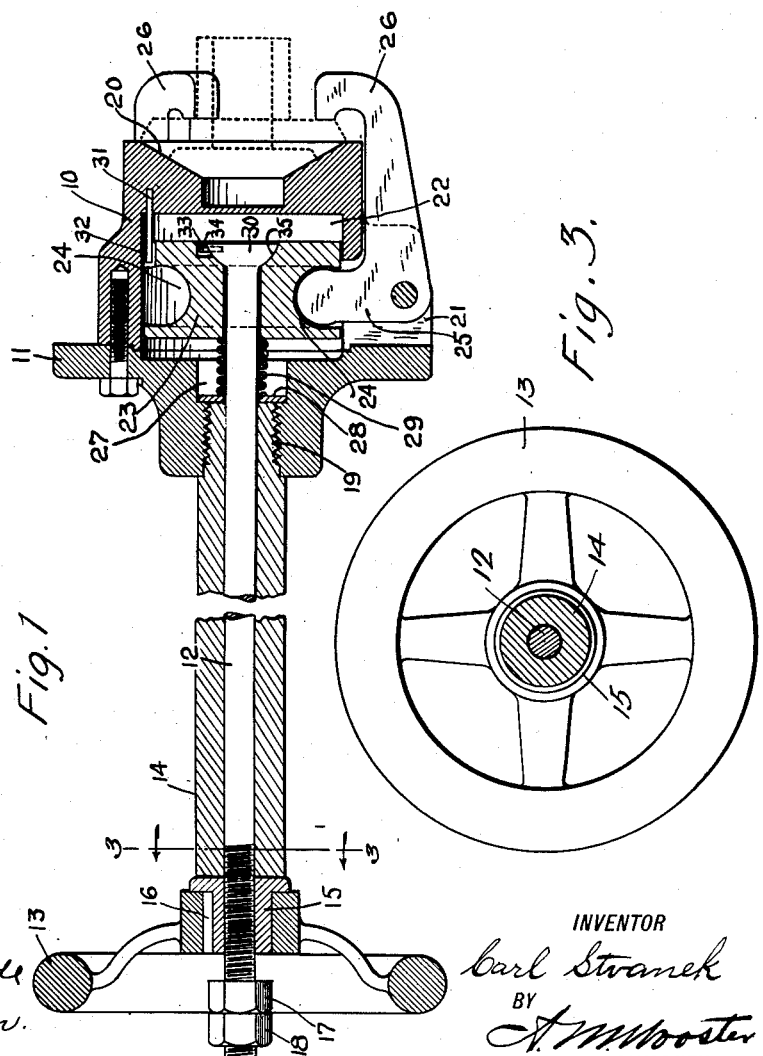
WITNESSES:
H. W. Meade
S. W. Atherton
INVENTOR
Carl Stvanek
BY
A. M. Wooster
ATTORNEY

UNITED STATES PATENT OFFICE.

CARL STVANEK, OF STRATFORD, CONNECTICUT.

BEVEL-GEAR CHUCK.

1,022,761.     Specification of Letters Patent.     Patented Apr. 9, 1912.

Application filed December 20, 1910. Serial No. 598,461.

*To all whom it may concern:*

Be it known that I, CARL STVANEK, a citizen of the United States, residing at Stratford, county of Fairfield, State of Connecticut, have invented an Improvement in Bevel-Gear Chucks, of which the following is a specification.

This invention has for its object to provide a chuck especially adapted to grind true the central hole in bevel or miter gears, which is adapted to be carried by the head stock or tail stock of a lathe or grinding machine or which may be used on the table of a drill press. It is of course well understood that in the process of hardening the gears frequently become more or less distorted and the central holes thrown out of true. As it is essential for perfectly running gears that the bearing holes be true with the working face of the teeth, it follows that in grinding, the face of the teeth must be held rigidly against a support so as to place the exact center of the gear in line with the spindle of the machine upon which it is used. The grinding is effected by rotating the chuck and moving a grinding wheel forward into the hole.

In order to provide a chuck which may be used upon various types of machines, will hold the gear perfectly rigid for grinding and will automatically adapt itself to inequalities in the gear so that all of the clamping jaws will have firm bearing thereon, I have devised the novel chuck which I will now describe, referring to the accompanying drawing forming a part of this specification and using reference characters to indicate the several parts.

Figure 1 is a longitudinal section of my novel chuck as in use, gripping a bevel gear which is indicated by dotted lines; and Fig. 2 is a front elevation of the chuck, the jaws being in the gripping position. Fig. 3 is a section on line 3—3 on Fig. 1.

10 denotes the body of my novel chuck, 11 the base which is rigidly secured thereto, 12 the spindle and 13 the hand wheel. The chuck is carried by a rotating shaft indicated by dotted lines as at 14. The hand wheel is provided with a bushing 15 which is secured to the hub by a key 16. The rear end of the spindle is threaded to engage the bushing and the chuck as a whole is locked to the shaft by tightening up a nut 17 and set nut 18 at the end of the spindle, the ends of the shaft being gripped by the base and head of the bushing when the hand wheel is turned tightly to place. The forward end of the shaft is threaded to engage a threaded hole 19 in the base, the spindle being adapted to move longitudinally in the shaft. The bevel gear to be ground is seated in a recess 20 in the face of the body and is secured there by the jaws 26 (three in number) which are pivoted in slots in ears 21 on the body and are suitably shaped to overhang the back face of the gear, as clearly shown in Fig. 1. The body is provided with a central recess 22 which extends to the rear thereof and receives loosely a block 23 which is provided with rounded sockets 24 to receive correspondingly-shaped arms 25 at the rear ends of the jaws. The base is provided with a socket 27 at the bottom of which is a plate 28. A spring 29 bearing against this plate and the rear face of the block acts to throw the block forward and tilt the jaws backward to release the gear wheel when the hand wheel is turned backward on the spindle. The spindle passes loosely through the block and is provided at its forward end with a rounded head 30 which engages a correspondingly-shaped socket 35 in the forward end of the block. Rotation of the block relatively to the body is prevented by means of a pin 31 which is rigidly seated in the body and loosely engages a recess 32 in the block, and the spindle is held against rotation relatively to the block by means of a pin 33 which is rigidly seated in the head and loosely engages a recess 34 in the block.

The operation will be readily understood from the drawing.

To lock a gear wheel in position to be operated upon, the nuts and hand wheel are turned backward on the spindle which permits the spring to throw the block forward and tilt the jaws backward permitting the gear wheel to be readily placed in position in recess 20. The hand wheel is then turned forward on the spindle which draws the block backward against the power of the spring drawing the jaws backward also and tilting the gripping ends forward into engagement with the back face of the gear.

A vitally important feature of the invention lies in the fact that the block is loose in recess 22 and has tilting movement therein and that the rounded head of the spindle engaging a correspondingly rounded socket in the forward end of the block permits the block to tilt freely, so that when the hand wheel is turned forward on the spindle the block will tilt sufficiently to cause the jaws to adapt themselves to any irregularities in the gear wheel, the result being that the gear wheel is firmly and rigidly seated in recess 20 and each of the three jaws is caused to bear equally and with perfect rigidity on the outer face of the gear wheel locking it rigidly in position to be operated upon.

Having thus described my invention I claim:

1. A chuck of the character described comprising a chambered body, jaws pivoted to said body, an operating block located in the chamber of said body and operatively connected with said jaws, and a controlling spindle for said block projecting into said chamber, said block being loosely mounted on said spindle and movable laterally and longitudinally in said chamber.

2. A chuck of the character described comprising a body, jaws pivoted thereto, an operating spindle passing through said body, a block with which the jaws have operative engagement mounted on said spindle and having tilting and sliding movement relative to said body, and means for moving said spindle to cause the jaws to grip or release a piece of work.

3. A chuck of the character described comprising a body, jaws pivoted thereto, an operating spindle passing through said body, a block mounted on said spindle and having operative engagement with said jaws, said block being capable of tilting and sliding movement relative to said spindle, means for moving said spindle to slide the block in one direction, whereby the jaws will grip a piece of work, and means independent of the spindle for moving said block in the opposite direction to cause the jaws to release the work.

4. A chuck of the character described comprising a body, jaws pivoted thereto, an operating spindle passing through said body, a block mounted on said spindle with which the jaws have operative engagement, said block being capable of sliding and tilting movement in said body, means for moving said spindle to cause the jaws to grip and release a piece of work, and means for holding the block against rotation relative to the body.

5. A chuck of the character described comprising a body, jaws pivoted thereto, a tilting sliding block with which the jaws have operative engagement and which is provided with a rounded socket, a spindle passing loosely through said block and having a rounded head engaging the socket, for the purpose set forth, means for drawing the spindle backward and a spring for forcing the block forward.

6. A chuck of the character described comprising a body, jaws pivoted thereto, a tilting sliding block with which the jaws have operative engagement and which is provided with a rounded socket, a spindle passing loosely through said block and having a rounded head engaging the socket, for the purpose set forth, means for drawing the spindle backward, a spring for forcing the block forward and means for locking the spindle and block against independent rotation.

7. A chuck of the character described comprising a base, a body secured thereto and having a chamber therein, an operating block working in said chamber, jaws pivoted to said body and in operative engagement with said block, a spring interposed between said block and said base, said block being capable of sliding and tilting movement in said chamber.

8. A chuck of the character described comprising a body, jaws pivoted thereto and provided with rounded arms, a tilting sliding block having sockets with which said arms have operative engagement and a rounded socket in its forward end, a spindle passing loosely through the block and having a rounded head engaging said socket, means for moving said spindle backward and a spring for moving the block forward.

9. A chuck of the character described comprising a chambered body, jaws pivoted to said body, an operating block located in the chamber of said body and operatively connected with said jaws, and a controlling spindle for said block projecting into said chamber, said block being mounted on said spindle and capable of movement longitudinally and laterally in said chamber.

10. A chuck of the character described comprising a body having a recess adapted to receive a beveled gear, jaws pivoted to the body and adapted to engage a gear in said recess, an operating spindle, a block mounted on said spindle and tiltingly and slidably mounted in said body with which the jaws have operative engagement, and means for operating said spindle to close and open said jaws.

11. A chuck of the character described comprising a body having a recess adapted to receive a bevel gear, jaws pivoted to the body and adapted to engage a gear in the recess, a tilting sliding block with which the jaws have operative engagement and which is provided with a rounded socket, a spindle passing loosely through the block and having a rounded head engaging the socket, for the purpose set forth, means for drawing the spindle backward and a spring for forcing the block forward.

12. A chuck of the character described comprising a body, jaws pivoted thereto, a tilting sliding block with which the jaws have operative engagement and which is provided with a rounded socket, a spindle passing freely through the block and having a rounded head engaging the socket and means for drawing the spindle backward, for the purpose set forth.

In testimony whereof I affix my signature in presence of two witnesses.

CARL STVANEK.

Witnesses:
A. M. WOOSTER,
S. W. ATHERTON.